United States Patent
Takeshima

(10) Patent No.: US 7,820,136 B2
(45) Date of Patent: Oct. 26, 2010

(54) PROCESS FOR PRODUCTION OF COMPOUND OXIDES

(75) Inventor: Shinichi Takeshima, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 235 days.

(21) Appl. No.: 10/786,046

(22) Filed: Feb. 26, 2004

(65) Prior Publication Data
US 2004/0171483 A1    Sep. 2, 2004

(30) Foreign Application Priority Data
Feb. 28, 2003   (JP) .............................. 2003-053597

(51) Int. Cl.
*C01B 13/14* (2006.01)
(52) U.S. Cl. ................. 423/592.1; 423/579; 423/593.1; 423/594.12
(58) Field of Classification Search .............. 423/592.1, 423/593.1, 594.12
See application file for complete search history.

(56) References Cited

U.S. PATENT DOCUMENTS

| | | | | |
|---|---|---|---|---|
| 4,987,012 A | * | 1/1991 | Sato et al. .................... | 427/221 |
| 5,023,071 A | * | 6/1991 | Sherif ......................... | 423/263 |
| 5,242,674 A | | 9/1993 | Bruno et al. | |
| 5,670,088 A | * | 9/1997 | Chittofrati et al. ............ | 516/22 |
| 5,863,850 A | * | 1/1999 | Nawa et al. .................. | 501/105 |
| 2002/0061816 A1 | * | 5/2002 | Uenishi et al. .............. | 502/304 |
| 2002/0132732 A1 | | 9/2002 | Brezny et al. | |

FOREIGN PATENT DOCUMENTS

| | | |
|---|---|---|
| EP | 0 362 962 A2 | 4/1990 |
| JP | A 2-175602 | 7/1990 |
| JP | A 7-246343 | 9/1995 |

(Continued)

OTHER PUBLICATIONS

Masui et al., "Characterization and catalytic properties of $CeO_2ZrO_2$ ultrafine particles prepared by the microemulsion method," Journal of Alloys and Compounds 269, pp. 116-122, 1998.

(Continued)

*Primary Examiner*—Stanley Silverman
*Assistant Examiner*—Paul A Wartalowicz
(74) *Attorney, Agent, or Firm*—Oliff & Berridge, PLC

(57) ABSTRACT

To provide a process for production of compound oxides having homogeneously diffused and mixed elements, there is provided a process for production of compound oxides, comprising contacting an organic phase having dissolved therein an organic compound which produces the hydroxide of a first element when hydrolyzed, with an aqueous phase containing a second element as an ion, to produce the hydroxide of the first element by hydrolysis reaction of the organic compound at the interface while incorporating the second element in the product, and firing the resulting product to produce a compound oxide of the first element and second element. Third or additional elements may be included in the aqueous phase to produce compound oxides comprising third or additional elements.

7 Claims, 3 Drawing Sheets

FOREIGN PATENT DOCUMENTS

| | | |
|---|---|---|
| JP | A 8-215569 | 8/1996 |
| JP | A 9-86907 | 3/1997 |
| JP | A 10-216517 | 8/1998 |
| WO | WO 02/094716 A1 | 11/2002 |

OTHER PUBLICATIONS

Pang et al., "Aluminium oxide nanoparticles prepared by water-in-oil microemulsions", Journal of Materials Chemistry., 2002, 12, pp. 3699-3704.

Tartaj et al., "Microstructural Evolution of Iron-Oxide-Doped Alumina Nanoparticles Synthesized from Microemulsions", Chem. Matter. 2002, 14, pp. 536-541.

Balint et al., "Morphology and oxide phase control in the microemulsion mediated synthesis of barium stabilized alumina nanoparticles", Phys. Chem. Chem. Phys., 2002, 4, pp. 2501-2503.

Material Safety and Data Sheet for 95% Ethanol. Fisher Scientific UK. Created Jul. 27, 1999.

Office Action for U.S. Appl. No. 11/631,174, mailed Dec. 2, 2009.

* cited by examiner

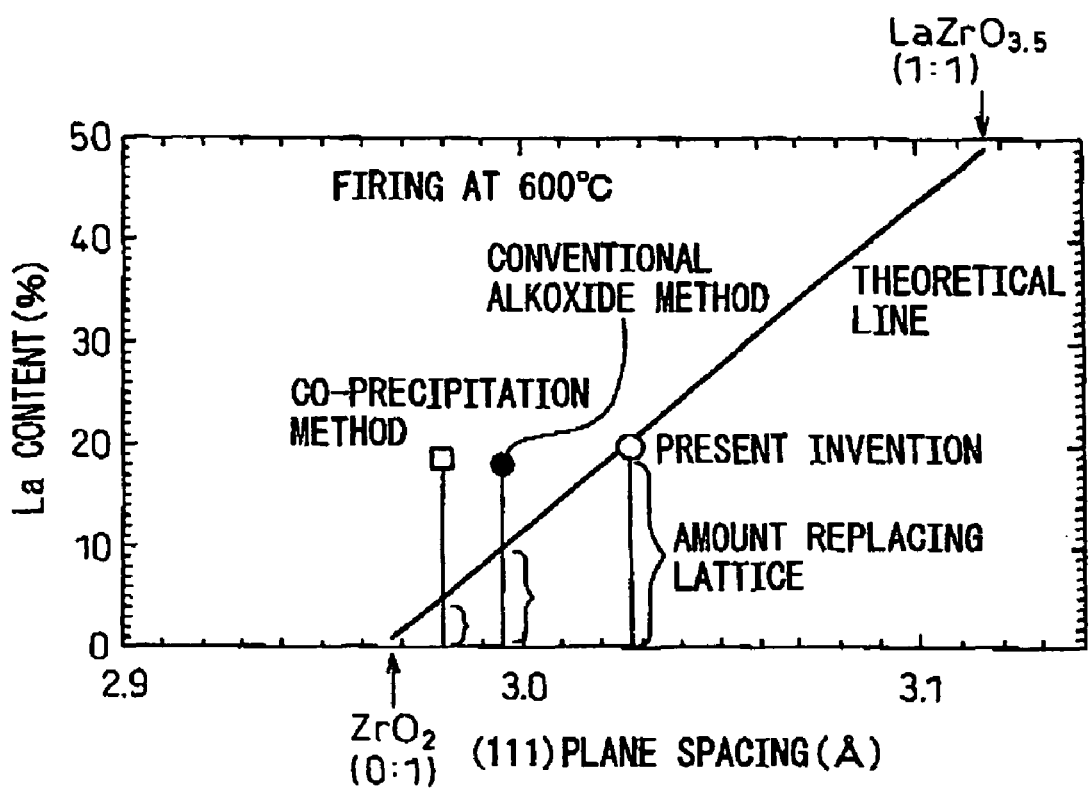

PROCESS FOR PRODUCTION OF COMPOUND OXIDES

TECHNICAL FIELD

The present invention relates to a process for production of compound oxides. More specifically, it relates to a novel hydrolysis method which allows production of compound oxides wherein a hydrolysis reaction at the interface between an organic phase and aqueous phase is utilized to produce a compound oxide, with the ions being situated in the aqueous phase to attain more uniform distribution of multiple elements in the composite oxide.

BACKGROUND OF THE INVENTION

Commonly known processes for producing compound oxide powders include simultaneous powder firing methods wherein powders of metal oxides or their precursor carbonates or hydroxides are combined and fired, co-precipitation methods wherein an alkali is added to an aqueous solution of multiple metal inorganic salts for neutralization, producing a colloidal dispersion of oxides or hydroxides, and alkoxide methods wherein water is added to multiple metal alkoxides dissolved in an organic solvent, for hydrolysis.

Simultaneous powder firing methods have a limitation in the degree of fineness of the powder, and require firing at high temperature to obtain compound oxides from the powder. High-temperature firing results in particle growth and reduced surface area. It is difficult in actuality to obtain fine powders of compound oxides, with large surface areas, which are completely homogeneous on the atomic level.

Co-precipitation methods utilize neutralizing precipitation reaction of multiple inorganic ions in aqueous solution, and while the colloid particles produced have fine particle sizes, the precipitation reaction for each inorganic ion depends on the pH and therefore each of the individual colloid particles tend to comprise single metal oxides or metal hydroxides, such that a compound oxide homogeneously mixed at the atomic level is not obtained.

Conventional alkoxide methods employ hydrolysis of multiple metal alkoxides in organic solvents but, as the stabilities and hydrolysis reaction rates differ depending on the metal alkoxide, the oxides of different metals are produced in different orders, and therefore it has not been possible to obtain compound oxides which are homogeneously mixed at the atomic level.

On the other hand, there have been proposed methods of synthesizing catalytically active particles precious metal particles or compound oxide particles such as ceria-zirconia) in a microemulsion, and then simultaneously synthesizing an oxide carrier around the catalytically active particles in the reaction field (Japanese Unexamined Patent Publication HEI No. 10-216517, Japanese Unexamined Patent Publication HEI No. 7-246343). These methods are for the purpose of inhibiting sintering by movement of the catalytically active particles and preventing heat deterioration of the catalyst, but they do not improve the diffusibility of the metal ions composing the compound oxides, as set forth by the present invention.

One of the important uses of compound oxides is as catalysts or catalyst carriers and, particularly, as exhaust gas purification catalysts for internal combustion engines. For example, addition of cerium oxide has been examined because of its performance for purification of hydrocarbons, carbon monoxide and nitrogen oxides in internal combustion engine exhaust gas, and for its oxygen storing function whereby it stores oxygen in oxidizing atmospheres while releasing oxygen in reducing atmospheres. However, because cerium oxide undergoes a major reduction in performance at high temperatures, it has been proposed to use cerium-zirconium compound oxides, containing added zirconia and the like, to confer heat resistance (Japanese Unexamined. Patent Publication HEI No. 8-215569). Still, as cerium-zirconium compound oxides are produced by the alkoxide method mentioned above, the metal ions (elements) do not homogeneously mix on the atomic level with firing at about 600° C.

In light of the current situation of the prior art as described above, it is an object of the present invention to provide a novel process for production of compound oxides which allows production of compound oxides having the metal ions (elements) homogeneously mixed on the atomic level.

SUMMARY OF THE INVENTION

The present invention is the result of much diligent research directed toward solving the problems described above, and was completed upon finding that when an organic metal compound comprising a first metal element is subjected to hydrolysis reaction and a second metal element is present in the aqueous phase instead of the, organic phase, the second metal element in the aqueous phase is incorporated into the resulting hydrolysis product of the first metal element, making it possible to obtain a compound oxide with the first metal element and second metal element homogeneously mixed on the atomic level. In other words, the present invention provides the following.

(1) A process for production of a compound oxide, comprising contacting an organic phase having dissolved therein an organic compound which produces a hydroxide of a first element when hydrolyzed, with an aqueous phase containing a second element as an ion, to produce a product of the hydroxide of the first element by hydrolysis reaction of the organic compound at the interface while incorporating the second element in the product during the process, and firing the obtained compound hydroxide (precursor) to produce a compound oxide of the first element and second element.

(2) A process for production of a compound oxide according to (1) above, wherein said aqueous phase further contains a third element, or additional elements, as ions, in addition to the second element, said product further contains a third element, or additional elements, and the obtained compound oxide is a compound oxide of the first, second and third or additional elements.

(3) A process for production of a compound oxide according to (1) or (2) above, wherein the reaction system is a water-in-oil type emulsion system or a microemulsion system.

(4) A process for production of a compound oxide according to (3) above, wherein the size of the aqueous phase of the water-in-oil type microemulsion is in the range of 2-40 nm.

(5) A process for production of a compound oxide according to any one of (1) to (4) above, wherein said organic compound is a metal alkoxide or acetonate-metal complex, and the second and/or third or additional element ions are ions of inorganic acid metal salts.

(6) A process for production of an exhaust gas purifying catalyst carrier, characterized by producing the exhaust gas purification catalyst carrier by a production process according to any one of (1) to (5) above.

BRIEF DESCRIPTION OF THE DRAWINGS

FIG. 4 is a graph showing the lattice spacings for lanthana-zirconia produced in an example and by a conventional method.

PREFERRED MODE OF CARRYING OUT THE INVENTION

Figure 1:
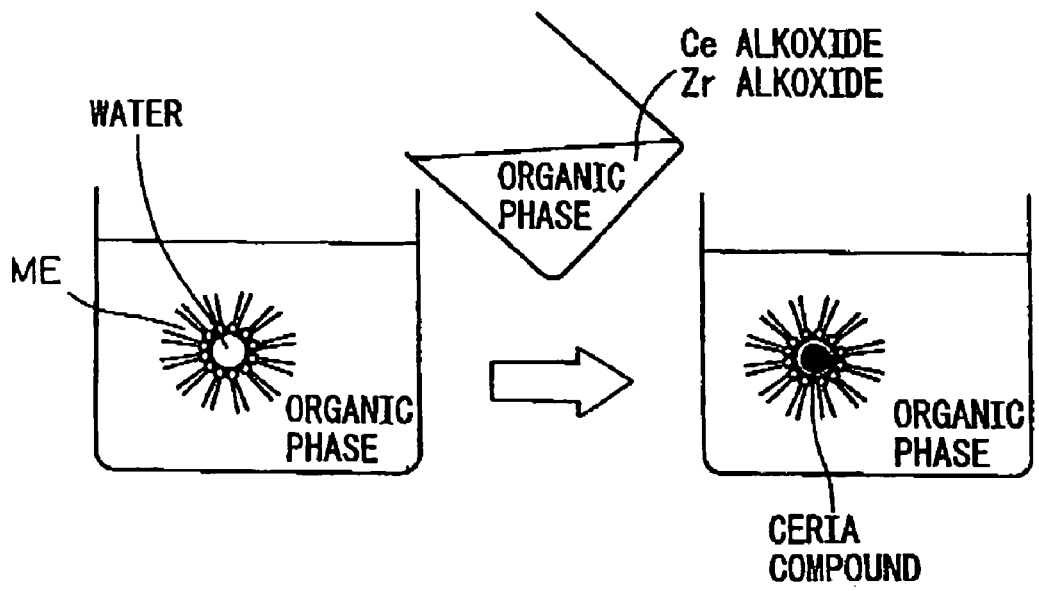
FIG. 1 is a schematic illustration of the conventional alkoxide method.

There are no special restrictions on the type of compound oxide produced by the process of the invention. It is sufficient if the compound oxide comprises at least a first element and a second element. Compound oxide systems are known from numerous textbooks, handbooks and the like. Most oxides of the many elements which form metal oxides such as alumina, zirconia, ceria, silica, iron oxide, manganese oxide, chromium oxide, yttrium oxide and the like can also form compound oxides with addition of a second metal element. It is already known which elements together form compound oxides. The present invention may be applied for all such compound oxides providing that the hydrolyzable organic compound starting materials and inorganic metal salt starting materials are available.

Throughout the present specification, the organic compounds which produce hydroxides upon hydrolysis will be referred to simply as organic metal compounds for convenience. However, the metals of the organic metal compounds are not metals in the strict sense but refer generally to any element M which can form a bond M-O-M.

Useful compound oxides for exhaust gas purification catalysts, which constitutes merely an example of the use of compound oxides and is not restrictive on the present invention in any way, include cerium and zirconium compound oxides, lanthanum and zirconium compound oxides, lanthanum-stabilized alumina, barium-stabilized alumina and lanthanum, strontium and zirconium compound oxides.

Organic compounds which produce hydroxides upon hydrolysis are known, and any one may be used for the purpose of the invention. As examples there may be mentioned metal alkoxides and acetylacetone-metal complex salts. It is sufficient if the organic metal compound produces a metal hydroxide or metal oxide upon hydrolysis.

Metal elements M that form metal alkoxides include elements from Group 1 to Group 14, sulfur, selenium and tellurium from Group 16 and phosphorus, arsenic, antimony and bismuth from Group 15, but it has been reported that the platinum family elements and some lanthanoids do not form alkoxides. Silicon alkoxides and germanium alkoxides, for example, are also known as metal alkoxides. Various types of metal alkoxides are marketed with known production processes, and are therefore readily available.

The hydrolysis reaction for metal alkoxides $M(OR)_n$ (where M is a metal and R is an alkyl group such as methyl, ethyl, propyl or butyl), is known and is represented formally by $M(OR)_n + nH_2O \rightarrow M(OH)_n + nROH$, followed by $M(OH)_n \rightarrow MO_{n/2} + n/2 H_2O$.

The hydrolysis reaction for acetylacetone complexes $(CH_3COCH_2COCH_3)_nM$ (where M is a metal) is also known and is represented by $(CH_3COCH_2COCH_3)_nM + nROH \rightarrow nCH_3COCH_2C(OH)CH_3 + M(OH)_n$, followed by $M(OH)_n \rightarrow MO_{n/2} + n/2 H_2O$.

Various types of acetylacetone metal complexes with known production processes are marketed, and are therefore readily available. Typical ones include aluminum acetonate, barium acetonate, lanthanum acetonate and platinum acetonate, and these are more abundant than alkoxides.

Organic metal compounds such as metal alkoxides and acetonate-metal complexes dissolve relatively easily if the solvent is appropriately selected from among polar organic solvents and nonpolar organic solvents.

Examples of organic solvents include hydrocarbons such as cyclohexane or benzene, linear alcohols such as hexanol and ketones such as acetone. The criteria for selecting the organic solvent include the solubility of the surfactant, and the width of the range for forming microemulsions (a high water/surfactant molar ratio).

It is known that when water is added to an organic phase in which is dissolved an organic metal compound which produces a hydroxide upon hydrolysis, the organic metal compound begins to progressively undergo a hydrolysis reaction. In most cases, the metal hydroxide may be obtained by adding water to the organic phase in which the organic metal compound is dissolved, and stirring.

It is also known that fine metal hydroxides or oxides may be produced by first forming a water-in-oil emulsion or microemulsion with the aqueous phase finely dispersed in an organic phase (oil phase) using a surfactant, and adding an organic metal compound (a solution of the organic metal compound in an organic solvent) to the organic phase (oil phase) and stirring. Without being limited by theory, it is believed that fine particles of the product are obtained because numerous micelles comprising the aqueous phase surrounded by the surfactant act as reaction nuclei, or the surfactant stabilizes the fine particles of the produced hydroxide.

It is known that dissolving multiple hydrolyzable organic metal compounds in the organic phase in a hydrolysis reaction of this type simultaneously produces multiple metal hydroxides when it is contacted with water, hydrolyzing the multiple organic metal compounds.

The present invention is characterized in that, when one type of hydrolyzable organic metal compound (a compound containing the first element) is situated in the organic phase and the organic phase is contacted with the aqueous phase, the second metal element and the third or additional metal elements are present as ions in the aqueous phase, instead of in the organic phase as is conventional.

Their presence as ions in the aqueous phase allows the use of water-soluble metal salts and, particularly, inorganic acid salts such as nitric acid salts and chlorides, and organic acid salts such as acetic acid salts, lactic acid salts and oxalic acid salts. The second element ion in the aqueous phase may be a simple ion of the metal or a complex ion including the second element. This also applies to the third and additional element ions.

When the organic phase and aqueous phase are contacted, the organic metal compound in the organic phase contacts with water, causing a hydrolysis reaction which produces a hydroxide or oxide of the first metal. It was discovered that according to the invention, the metal ion(s) in the aqueous phase are incorporated into the hydroxide (or oxide) of the first metal produced from hydrolysis, and this phenomenon has hitherto been unknown. While it is not fully understood why the ion(s) in the aqueous phase are incorporated into the hydroxide without a special precipitating process, it is believed to be as follows (using an alkoxide as the organic metal compound). When the alkoxide undergoes hydrolysis it proceeds with the second metal ion in the aqueous phase precipitating the alkoxide, or else the minute hydroxide resulting from hydrolysis of the alkoxide aggregates while sequestering a certain amount of the metal ions in the aqueous phase.

In particular, it was found that in this novel production process of the invention, the second metal element ion in the aqueous phase is incorporated into the hydroxide obtained by hydrolysis of the organic metal compound of the first metal element in the organic phase, but that the resulting hydroxide comprises the first metal element and second metal element diffused in a highly homogeneous manner; this homogeneity is notably superior to that obtained by conventional alkoxide methods, specifically those wherein multiple metal alkoxides are present in the organic phase. As indicated in the examples described below, even firing at relatively low temperature yielded compound oxides (solid solutions) wherein the first metal element and second metal element of the fired compound oxide were ideally mixed on the atomic level. This has not been achieved with conventional metal alkoxide methods. As stability differs depending on the type of metal alkoxide used in conventional metal alkoxide methods, the first metal element and second metal element are not homogeneously distributed in the product.

The relative ratio of the first metal element and second metal element in the compound oxide obtained according to the invention may be adjusted by changing the ratio of the amounts of the first metal element in the organic phase and second metal element in the aqueous phase.

According to the invention, the reaction system is preferably a water-in-oil emulsion or microemulsion system. This is believed to produce a homogenizing effect, firstly by speeding the hydrolysis rate due to the extremely small microemulsion size of from a few nanometers to ten or more nanometers and the very large oil phase/aqueous phase interface (about 8000 m$^2$/liter with a 10 nm size) and secondly by division of the aqueous phase which results in an extremely small number of metal ions (approximately 100) per droplet.

From this standpoint, the size of the microemulsion aqueous phase is preferably 2-40 nm, more preferably 2-15 nm and even more preferably 2-10 nm.

Methods for forming water-in-oil emulsion systems or microemulsion systems are known. As organic phase media there may be used the aforementioned organic solvents, including hydrocarbons such as cyclohexane or benzene, linear alcohols such as hexanol and ketones such as acetone. Surfactants to be used for the invention include various different nonionic surfactants, anionic surfactants and cationic surfactants, which are used in combination with the organic phase (oil phase) component as appropriate for the purpose of use.

As nonionic surfactants there may be used polyoxyethylenenonylphenyl ether-based surfactants such as polyoxyethylene(n=5)nonylphenyl ether, polyoxyethyleneoctylphenyl ether-based surfactants such as polyoxyethylene(n=10)octylphenyl ether, polyoxyethylenealkyl ether-based surfactants such as polyoxyethylene(n=7) cetyl ether, and polyoxyethylenesorbitan-based surfactants such as polyoxyethylenesorbitan trioleate.

As anionic surfactants there may be used sodium di-2-ethylenehexylsulfosuccinate and the like, and as cationic surfactants there may be used cetyltrimethylammonium chloride, cetyltrimethylammonium bromide and the like.

Although a water-in-oil emulsion system or microemulsion system is preferred, the production process of the invention may also be carried out in an oil-in-water emulsion system.

According to the invention, a third element or additional elements are included in the aqueous phase in cases where a compound oxide of three or more elements is to be produced. If multiple hydrolyzable organic metal compounds are present in the organic phase, the resulting product will be non-homogeneous because of the difference in stabilities of the hydrolyzable organic metal compounds in the organic phase. The first metal element and second metal element must of course be homogeneously distributed, but if homogeneity between the first metal element and third metal element is not necessary, the organic metal compound of the third element may be in the organic phase.

As mentioned above, a hydrolysis reaction carried out by contacting an organic phase with an aqueous phase generally produces a hydroxide (precursor). According to the invention the product is further dried and then fired to produce a compound oxide. The methods of separating and drying the product may be conventional methods.

The firing conditions may also be according to conventional methods, while the firing temperature, firing atmosphere, etc. may be appropriately selected depending on the type of compound oxide. Generally, however, firing may be conducted at lower temperatures than according to the prior art. This is attributed to the fact that the metal elements are already homogeneously distributed and therefore less energy is needed to diffuse the metal elements in the solid.

One of the objects for the process for production of compound oxides of the invention is a cerium-zirconium compound oxide for use as an exhaust gas purification catalyst carrier. Ceria has an oxygen storing function whereby it stores oxygen in oxidizing atmospheres while releasing oxygen in reducing atmospheres, but the oxygen storage function is known to decrease upon deterioration under high temperature. Methods of adding zirconium to ceria for improved heat resistance are known, but because ceria and zirconium do not intermix homogeneously, addition of large amounts of zirconium for heat resistance tends to reduce the oxygen storage function. According to the process of the invention, however, a compound oxide is obtained having cerium and zirconium homogeneously mixed, thereby allowing the heat resistance to be improved while retaining the oxygen storage function on the other hand, zirconia has been noted as a functional catalyst carrier comparable to alumina in recent years. In particular, compounds with zirconia replaced by rare earth elements have higher heat resistance than zirconia. The largest surface areas are obtained by addition of lanthanum. According to hitherto processes, however, the improvement in heat resistance and surface area has been insufficient, while the desired performance in terms of catalytic function has not been exhibited. Specifically, since only a portion of the added lanthanum replaces the zirconia lattice only few oxygen defects are created, and therefore total replacement with lanthanum has the potential to exhibit a new catalytic function. According to the process of the present invention, lanthanum can replace zirconia to synthesize a lanthana-zirconia compound oxide with high surface area and many oxygen defects.

By adding lanthanum, barium, strontium, potassium and other elements to aluminum by the process of the invention, it was possible to improve the heat resistance of alumina beyond the conventional level.

The present invention has a wide range of applications, as it may also be used for semiconducting oxides such as perovskite oxides, titania-based oxides, tin oxide and the like.

Figure 2:
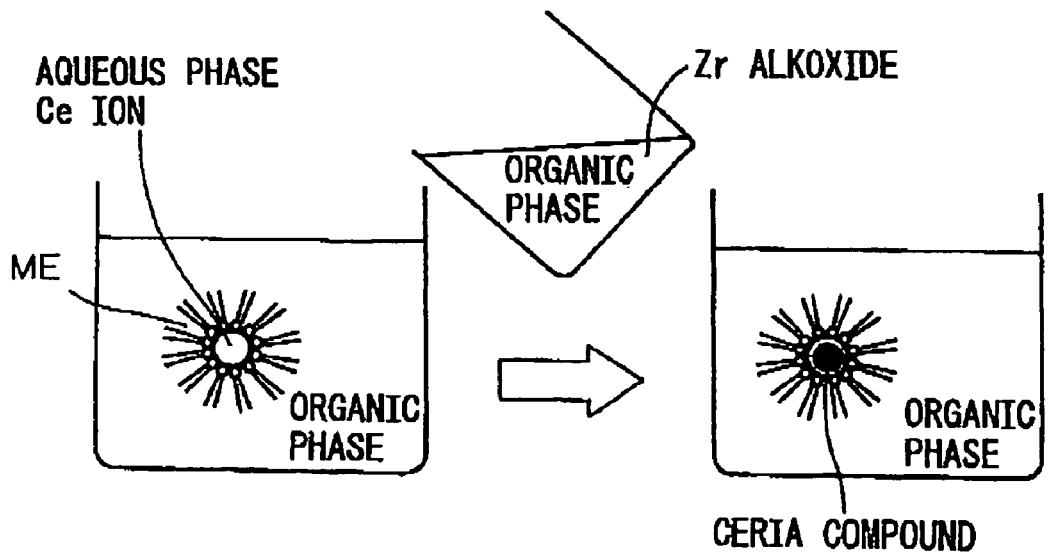
FIG. 2 is a schematic illustration of the process of the invention in comparison with FIG. 1.

FIG. 1 and FIG. 2 show a schematic comparison of the process of the invention and the conventional alkoxide method, for synthesis using a ceria-zirconia microemulsion as an example. Referring to FIG. 1 showing the conventional alkoxide method, a microemulsion is formed having water droplets (aqueous phase) formed in an organic phase (oil phase) using a surfactant, while an organic solution is prepared containing a dissolved cerium alkoxide and zirconium alkoxide, and the organic solution 4 is added to the microemulsion and mixed therewith to synthesize ceria-zirconia.

In contrast, in the process of the invention shown in FIG. 2, cerium nitrate or the like is dissolved in the aqueous phase of the microemulsion 14 and, then, a zirconium alkoxide is added and mixed therewith to synthesize ceria-zirconia. In other words, only one type of metal alkoxide is added to the organic phase of the microemulsion. Because of different stabilities when multiple metal alkoxides are added to the organic phase, it is impossible to obtain a homogeneous hydrolysis product when the organic phase is contacted with water, but according to the process of the present invention this problem is overcome. Consequently, for synthesis of a compound oxide with third or additional metal elements, the third or additional elements are added to the aqueous phase.

Hydrolysis reactions of hydrolyzable organic metal compounds are known. According to the invention, it was found that when a hydrolyzable organic metal compound in an organic phase is contacted with an aqueous phase for hydrolysis reaction and a second element is present as an ion in the aqueous phase, the second element is incorporated into the hydroxide produced by the hydrolysis reaction. The reaction occurs if the second element is present as an ion in the aqueous phase, and will occur as long as the second element is an element that can produce a compound oxide. It was further discovered that during the reaction, the first element in the organic metal compound and the second element in the aqueous phase can be homogeneously diffused and mixed in the hydrolysis reaction product and in the compound oxide.

EXAMPLES

The invention will now be explained in greater detail through the following examples, with the understanding that these examples in no way limit the invention.

Example 1

After placing 1850 parts of cyclohexane and 350 parts of polyethylene(n=5)nonylphenyl ether in a 3 liter volume beaker, an aqueous solution comprising 0.13 mole of cerium nitrate and 150 parts of distilled water was added and the mixture was stirred.

A magnetic stirrer was used for stirring at room temperature to prepare a water-in-oil microemulsion (measured water droplet diameter: 7.2 nm).

A zirconium alkoxide solution comprising 0.13 mole of zirconium butoxide dissolved in 200 parts of cyclohexane was separately prepared, and this was added to the microemulsion and thoroughly stirred therewith at room temperature, upon which the beaker contents immediately exhibited a whitish yellow cloudiness, with production of colloidal particles (particle size: approximately 10 nm).

The pH was then adjusted to 8 with ammonia water to control aggregation of the colloid. Stirring was continued for about one hour for maturation.

The mother liquor was filtered and the obtained precipitate was washed three times with ethanol and dried overnight at 80° C., after which it was fired in air at 700° C. and 900° C. to obtain a compound oxide containing cerium and zirconium (ceria-zirconia). The Ce/Zr molar ratio of the compound oxide was 1/1.

It is known that ceria-zirconia exhibits high oxygen occlusion performance when Ce replaces the Zr lattice at a high degree of diffusion (Catal. Today, 74, 225-234 (2002), Y. Nagai et al.). By measuring the oxygen occlusion it is possible to estimate the degree of replacement. The oxygen occlusion is most notably affected at particularly low temperatures (300° C. and below). The oxygen occlusion can be expressed in terms of oxidation and reduction of Ce, as follows.

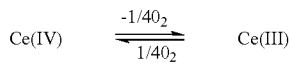

Figure 3:
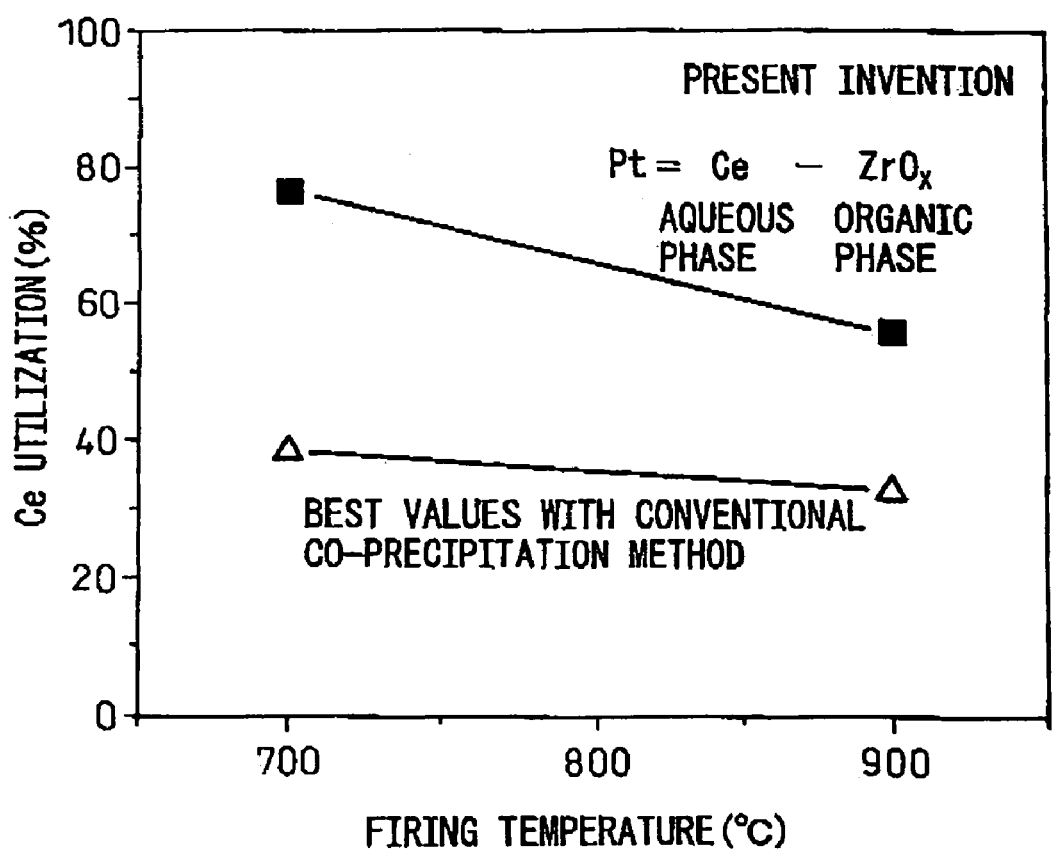
FIG. 3 is a graph showing comparison of the oxygen occlusion powers of ceria-zirconia produced in an example and by co-precipitation.

The oxygen occlusion power of the ceria-zirconia obtained in this example was evaluated using the oxygen pulse adsorption method. The cerium utilization was calculated from the oxygen occlusion power, giving the results shown in FIG. 3. FIG. 3 also shows the data for the best Ce utilization values obtained by the conventional co-precipitation method.

As seen in FIG. 3, high Ce utilization efficiency was obtained according to the invention even at low firing temperature, indicating that Zr and Ce had been highly diffused from the point of synthesis of the compound hydroxide. This demonstrated that the ceria-zirconia produced according to the invention can be utilized as a catalyst material exhibiting an unprecedented high activity at low temperature.

Example 2

Ceria-zirconia with a Zr/Ce molar ratio of 1/1 was produced in the same manner as Example 1, at a firing temperature of 600° C. A metal catalyst with a Pt/Rh molar ratio of 5/1 was loaded on the ceria-zirconia. The ceria-zirconia was used at 75 g to 1 L of the catalyst. The details are listed below.

A cordierite honeycomb carrier base material was immersed in purified water and then drawn out, and after wiping off the excess water, it was immersed in a slurry having the following composition.

| | |
|---|---|
| Alumina powder | 120 pts. by wt. |
| Alumina sol (70 wt % alumina content) | 10 pts. by wt. |
| 40 wt % aqueous aluminum nitrate | 70 pts. by wt. |
| Ceria-zirconia | 75 pts. by wt. |
| Purified water | 150 pts. by wt. |

It was then removed out of the slurry, and after wiping off the excess slurry and drying at a temperature of 250° C. for 20 minutes, it was fired at 500° C. for 1 hour, to form a catalyst carrier layer on the catalyst base material.

Next, the catalyst carrier layer-formed catalyst base material was impregnated with a dinitrodiamine platinum aqueous solution and a rhodium nitrate aqueous solution, and then removed and dried at 250° C. to load Pt at 2.0 g/l and Rh at 0.4 g/l.

The performance of the obtained three-way catalyst carried on ceria-zirconia was examined. The catalytic performance was determined by setting the catalyst in the exhaust system of an engine (2 L cylinder capacity) connected to an air-fuel ratio controller and maintaining an air/fuel ratio of 14.6 (stoichiometric) while increasing the exhaust gas temperature from the low temperature end, and analyzing each of the exhaust gas components. The temperature which produced a 50% purification rate was determined from these results and recorded as the 50% purification temperature.

The catalyst was also held for 5 hours in a 1000° C., stoichiometric and lean atmospheres and then subjected to the same performance test. The results are shown in Table 1 below. For comparison, Table 1 also shows the results for ceria-zirconia having the same chemical composition but produced by the conventional co-precipitation method. In Table 1, "THC T50 (° C.)" means the temperature at which 50% of an exhaust gas is cleaned by the catalyst.

TABLE 1

Heat resistance of three-way catalysts obtained by different ceria-zirconia production processes

| | THC T50 (° C.) | |
|---|---|---|
| Ceria-zirconia | Fresh product | After 1000° C. accelerated durability test |
| Conventional method | 242 | 352 |
| Present invention | 231 | 291 |

The results demonstrated that the ceria-zirconia of the example had lower deterioration with high temperature use. Presumably, satisfactory distribution of Ce and Zr not only results in high oxygen occlusion performance at low temperature but also maintains that condition to some degree even after a high-temperature endurance test.

Example 3

This example was conducted to further confirm that compound oxides synthesized by the production process of the invention have high initial distribution of the metal ions. There was examined a combination of metal ions which normally do not easily form solid solutions together, and specifically, replacement of $Zr^{4+}$ ion (ionic radius 0.839 Å) with $La^{3+}$ ion (ionic radius=1.158 Å) which has a larger ionic radius. When this combination was used in the conventional process, $La^{3+}$ ion did not completely dissolve in $ZrO_2$ without prolonged firing at about 1000° C.

The synthesis of Example 3 was carried out basically in the same manner as Example 1. It differed from Example 1, however, in that cerium nitrate was replaced with lanthanum nitrate, the La ion addition was 20% of the total metal ion content, and the firing temperature was slightly lower at 600° C.

Specifically, a surfactant solution was prepared in a 3 L volume beaker, and then an aqueous solution of 0.3 mole of lanthanum nitrate dissolved in 140 parts of distilled water was added dropwise and stirred therewith to prepare a microemulsion. Next, a solution of 0.12 mole of zirconium butoxide dissolved in 200 parts of cyclohexane was added dropwise for hydrolysis of the zirconium butoxide, and white cloudiness was immediately produced. The pH was then adjusted to 8.5 to control aggregation of the precipitate. Stirring was continued for one hour, and the product was matured washing, filtration and drying were carried out in exactly the same manner as Example 1. The firing was in air at 600° C. for 2 hours. A comparison catalyst was prepared according to an ordinary method and fired in the same manner.

The lanthana-zirconia according to the present invention thus synthesized in the same manner as Example 1 was analyzed by X-ray diffraction and the (111) plane spacing was determined.

A lanthana-zirconia sample fired at 600° C. was also analyzed by X-ray diffraction and the (111) plane spacing was determined. The results are shown in FIG. 4. For comparison, the corresponding data are shown for similar lanthana-zirconia produced by the conventional co-precipitation method and alkoxide method.

The solid line in FIG. 4 is a line connecting the values for (111) plane spacing of a theoretical crystal lattice given a composition of $ZrO_2$ (zero La content) and $LaZrO_{3.5}$ (50% La content), and represents the plane spacing calculated for each composition (La content). The products of the conventional co-precipitation method and alkoxide method had a shorter lattice constant than the theoretical value, indicating that most of the La had not replaced the $ZrO_2$ crystal lattice. In contrast, the lanthana-zirconia of the present invention example had exactly the theoretical plane spacing, indicating that $La^{3+}$ ion had almost completely replaced the $ZrO_2$ lattice.

Example 4

Because a clear crystal structure is not produced in alumina systems, replacement by a second element cannot be determined from the crystal structure. However, added elements such as lanthanum are known to increase the surface area of alumina, and this can be verified.

The procedure was carried out basically in the same manner as Example 1. A surfactant solution was prepared in a 3 L volume beaker, and then an aqueous solution of 5 parts of lanthanum nitrate in 80 parts of distilled water was added dropwise and stirred therewith to prepare a microemulsion. Next, a solution of 0.22 mole of aluminum isopropoxide dissolved in 200 parts of cyclohexane was added dropwise for hydrolysis of the aluminum isopropoxide, and a white cloudiness was immediately produced. The pH was then adjusted to 8.5 to control aggregation of the precipitate. Stirring was continued for one hour and the product was matured. Washing, filtration and drying were carried out in exactly the same manner as Example 1. The firing was in air at 600° C. for 2 hours. A comparison alumina catalyst carrier was prepared according to an ordinary method and fired in the same manner.

In addition, alumina powder containing no added lanthanum (alkoxide method), a mixed powder comprising this alumina powder with addition of lanthanum oxide powder, lanthanum-added alumina powder synthesized by the co-precipitation method and powder synthesized by the process of the invention were each fired at 900° C., and the surface areas were measured. The results are shown in Table 2.

TABLE 2

Effect of production process on heat resistance of alumina

| | Surface area (m²/g) upon firing at 900° C., 2 h |
|---|---|
| Alumina alone | 111 |
| Alumina + La oxide | 112 |
| Co-precipitation | 85 |
| Present invention | 195 |

With the conventional method, there was substantially no increase, and instead a decrease, in the, surface area even with addition of lanthanum oxide to alumina, whereas with the process of the invention a substantial increase in surface area was observed. This is attributed to the effect of the invention whereby the multiple ions are homogeneous, as in the previous examples.

Example 5

Because barium alkoxides are unstable, barium acetylacetonate is usually used in ordinary sol-gel methods. For comparison, therefore, barium acetylacetonate and aluminum acetylacetonate were used as solutions in 1-hexanol. Here, the Ba ion was added at 2 atomic percent with respect to the total metal ion. Hydrolysis was conducted with addition of water at about 10 times the amount necessary for hydrolysis.

The reaction mixture was stirred at 60° C. for one hour, matured and then filtered and dried.

Separately, a water-in-oil microemulsion was prepared as an example in the same manner as Example 1, using aqueous barium acetate as the aqueous phase and an aluminum acetylacetonate/1-hexanol solution as the organic phase, and with polyoxyethylene(n=10)octylphenyl ether as the surfactant, after which a solution of aluminum acetylacetonate in 1-hexanol was added thereto in an amount for the same atomic ratio as above (Al:La=98:2), and synthesis was carried out while stirring with a stirrer for one hour at approximately 40-30° C., without any special heating.

In addition, alumina containing no added barium (alkoxide method), barium-added alumina obtained by the aforementioned sol-gel method using acetylacetonate and barium-added alumina synthesized according to the example were each fired at 900° C. for 2 hours, and the surface areas thereof are shown in Table 3.

TABLE 3

Effect of production process on heat resistance of Ba-added alumina

| | Surface area (m$^2$/g) upon firing at 900° C., 2 h |
|---|---|
| Alumina alone | 111 |
| Sol-gel method | 105 |
| Present invention | 187 |

The example product maintained a large surface area, and the heat resistance as an alumina carrier was improved by addition of barium. On the other hand, the surface area was reduced somewhat with the conventional sol-gel method. This was attributed to poor diffusibility of barium by the sol-gel method, and reaction with alumina proceeding at the sections of high barium concentration. Another contributing cause is believed to be the difficulty of controlling dispersion (lowering the cohesion) in hydrolysis by the sol-gel method, leading to dense aggregation of the particles in the initial state.

Even though different starting materials are used, therefore, it is possible to synthesize oxides with high ion diffusion or distribution and high heat resistance by adding the different metal ions to the oil phase and aqueous phase of the microemulsion according to the process of the invention. The production process of the invention is not limited to alkoxides, and may be applied generally to any hydrolyzing organic metal compounds.

Example 6

After preparing a microemulsion in the same manner as Example 1 except for using as the aqueous phase an aqueous solution of two different metal salts, strontium nitrate and lanthanum nitrate, a solution of zirconium butoxide in cyclohexane was added for hydrolysis. The compositional molar ratio of Zr:La:Sr was 1:0.2:0.2. The synthesis temperature was approximately 40-30° C. without special heating, and the synthesis time was one hour.

For comparison, a compound oxide was also synthesized by the co-precipitation method. The starting materials used were zirconium nitrate, lanthanum nitrate and strontium nitrate. An aqueous solution was prepared and added dropwise to an aqueous ammonia solution adjusted to a final pH of 11.5. Stirring was continued slowly for one hour for maturation. The mixture was then dried and fired at 600° C.

The obtained compound oxides were all fired at 800° C. for 2 hours, and the surface areas are shown in Table 4.

TABLE 4

Effect of production process on heat resistance of LaSrZr compound oxide

| | Surface area (m$^2$/g) upon firing at 800° C., 2 h |
|---|---|
| ZrO$_2$ | 33 |
| Co-precipitation | 47 |
| Present invention | 92 |

Table 4 clearly shows that the product of the example had close to twice the surface area and higher heat resistance after firing at 800° C. (heat treatment) of the compound oxide, as compared to the product obtained by co-precipitation since ZrO$_2$ alone has low heat resistance, the improved heat resistance was attributed to homogeneous diffusion and solid solution of La and Sr in the ZrO$_2$ according to the process of the invention.

This example demonstrates that a homogeneous compound oxide can be produced even when two or more elements are present in the aqueous phase.

[Effect of the Invention]

According to the present invention there is provided a novel process for producing compound oxides, which process allows production of compound oxides having multiple elements diffused and mixed more homogeneously on the atomic level as compared or distributed to prior art methods. The process of the invention is novel, operates on a general principle, and may be widely applied to common compounds.

The invention claimed is:

1. A process for production of compound oxide particles, comprising:

contacting an organic phase having dissolved therein an organic compound of a metal alkoxide or an acetonate-metal complex, the metal of said metal alkoxide or acetonate-metal complex being hereinafter referred to as a first element, with an aqueous phase containing a second element as an ion, and a surfactant to form a microemulsion, in which a hydroxide of said first element is produced by a hydrolysis reaction of said organic compound at the interface between said organic and aqueous phases while incorporating said second element in the hydroxide, adding an alkali to the microemulsion to adjust the pH for colloid aggregation adjustment and maturing to form a matured product, and firing the matured product to produce particles of a compound oxide of said first element and second element, wherein said aqueous phase further contains a third or additional elements as ions, said product further contains a third or additional elements, and the obtained compound oxide is a compound oxide of the first, second and third or additional elements.

2. A process for production of compound oxide particles according to claim 1, wherein the size of the aqueous phase of the water-in-oil type microemulsion is in the range of 2-40 nm.

3. A process for production of compound oxide particles according to claim 1, wherein the second and/or third or additional element ions are ions of inorganic acid metal salts.

4. A process for production of an exhaust gas purifying catalyst carrier, characterized by producing the exhaust gas purification catalyst carrier by a production process according to claim 1.

5. A process for production of an exhaust gas purifying catalyst carrier, characterized by producing the exhaust gas purification catalyst carrier by a production process according to claim 2.

6. A process for production of an exhaust gas purifying catalyst carrier, characterized by producing the exhaust gas purification catalyst carrier by a production process according to claim 3.

7. A process for production of compound oxide particles according to claim 1, wherein the compound oxide particles have a composition that is uniform at the atomic level.

* * * * *